Patented Mar. 2, 1954

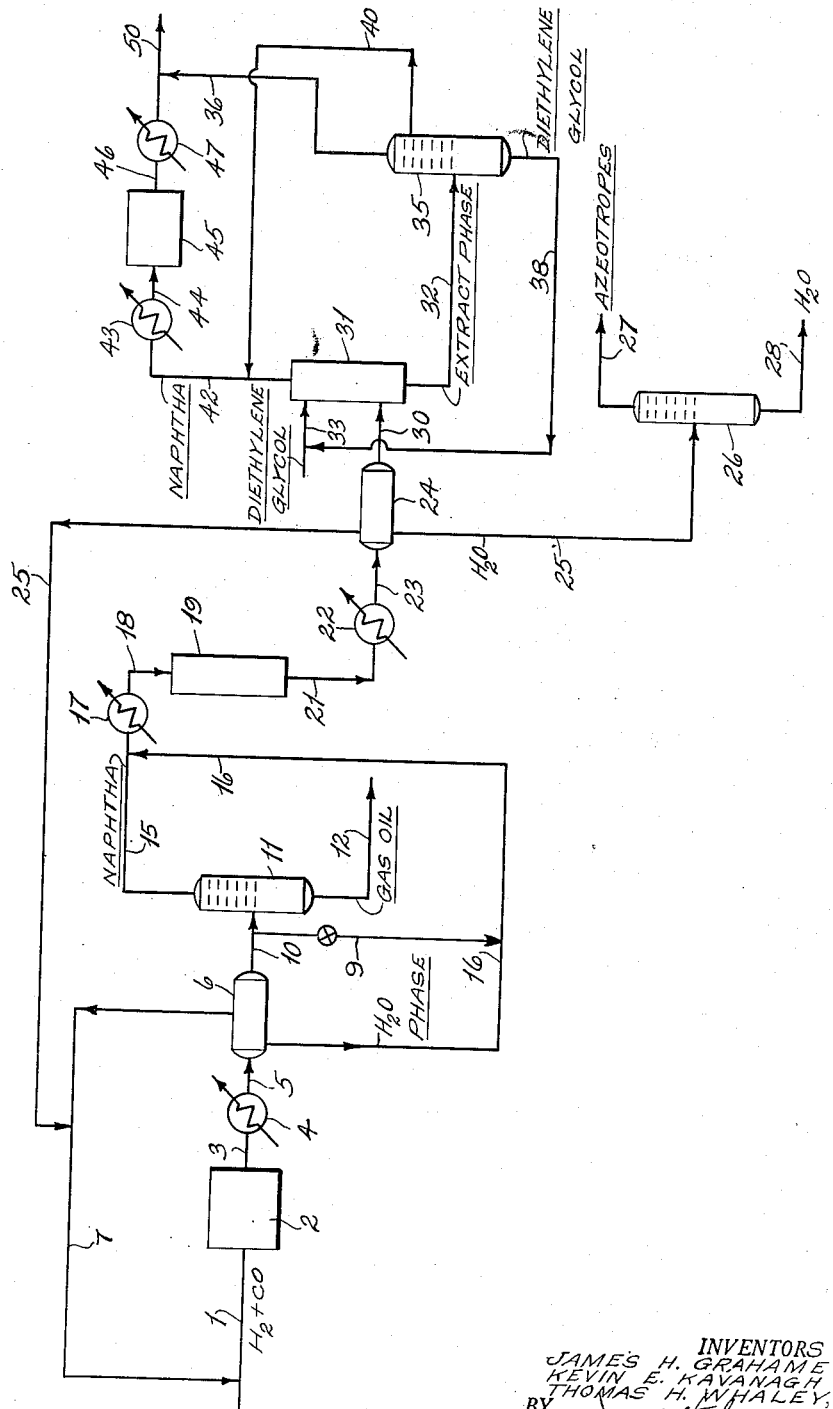

2,671,104

UNITED STATES PATENT OFFICE 2,671,104

PROCESS FOR PRODUCING MOTOR FUEL FROM SYNTHESIS PRODUCT

James H. Grahame, Mount Vernon, Kevin E. Kavanagh, Douglaston, and Thomas H. Whaley, Jr., Mount Vernon, N. Y., assignors to The Texas Company, New York, N. Y., a corporation of Delaware Application March 22, 1950, Serial No. 151,318

3 Claims. (Cl. 260—450)

This invention relates to a method for producing motor fuels from synthesis gas mixtures of carbon oxides and hydrogen. More particularly it relates to a method of converting liquid products obtained by the catalytic hydrogenation of carbon oxides into high yields of good quality motor fuels.

The production of normally liquid hydrocarbons and oxygen-containing compounds by the catalytic reaction of carbon monoxide and hydrogen is a well-known process. According to the methods commonly employed, a synthesis gas mixture comprising carbon monoxide and hydrogen in a molar ratio of about 1:2 is reacted at ordinary or increased pressure and at a temperature within the range of from about 400° F. to about 750° F. in the presence of a catalyst comprising a metal of the eighth group of the periodic system associated with small amounts of activators and promoters including alkali metal compounds and oxides of magnesium, aluminum and thorium. For the production of liquid products chiefly in the gasoline boiling range, the reaction is preferably carried out with an iron catalyst at pressures of about 100 to about 500 pounds per square inch and at temperatures of between 500° F. and 750° F. Under these conditions a liquid product containing considerable amounts of oxygenated organic compounds is obtained, and it is with this type of process that the present invention is particularly concerned.

In accordance with the process of our invention, oxygenated organic compounds of the type which constitute desirable components of gasoline are removed from a synthesis product obtained by the hydrogenation of carbon oxides before the product is subjected to a catalytic treatment at a relatively high temperature for conversion to high grade gasoline, and the oxygenated compounds are then combined with the gasoline obtained by the catalytic treatment. The oxygenates combined with the gasoline comprise chiefly alcohols and small amounts of ketones boiling within the gasoline boiling range, and preferably only those boiling within approximately the lower half of the gasoline boiling range, e. g., those boiling below about 285° F. This fraction of oxygenates comprises methanol, ethanol, propanols, butanols and pentanols, together with ketones in the same boiling range. Alcohols and ketones boiling in the range of from about 285° F. to about 500° F. may be converted to olefinic gasoline hydrocarbons, suitably by subjecting them in admixture with a hydrocarbon fraction of synthesis product to a high temperature catalytic treatment which converts the mixture to high grade gasoline.

Separation of oxygenated hydrocarbons from a synthesis product is suitably carried out by extracting the product with a hydrocarbon-immiscible alcohol solvent such as ethylene glycol. Other solvents may be used for this purpose also, including diethylene glycol, isopropylene glycol, triethylene glycol, trimethylene glycol and furfural. The extraction is preferably carried out upon the liquid hydrocarbon fraction of the synthesis products remaining after separation of gaseous and aqueous phases.

There is obtained by catalytically reacting carbon monoxide and hydrogen, a mixture of gaseous and normally liquid reaction products comprising hydrocarbons, water, and oxygenated organic compounds such as alcohols, acids, aldehydes, esters and ketones. Under the conditions set forth above for obtaining chiefly gasoline boiling products, the hydrocarbon products may comprise 10 to 15 per cent by volume of normally gaseous hydrocarbons, 60 to 80 per cent of hydrocarbons boiling in the gasoline boiling range, about 10 to 20 per cent of hydrocarbons boiling in the diesel fuel range, and small amounts of heavier hydrocarbons. About 2 volumes of water are produced for each volume of hydrocarbons. When the effluent gases from the synthesis reactor are cooled to condense normally liquid products, an aqueous phase and a hydrocarbon phase are formed. Oxygenated organic compounds, comprising from about 5 to 20 per cent of the total hydrocarbon product, are distributed between the two phases, with the light oxygenated compounds contained in the aqueous phase and the heavier oxygenated compounds contained in the hydrocarbon phase.

The usual treatment of product involves production of motor fuels from the mixture of hydrocarbons and oxygenated compounds forming the liquid hydrocarbon phase by the usual methods employed for the production of motor fuels from like boiling petroleum hydrocarbons, including fractionation to separate a fraction boiling in the gasoline boiling range, and catalytically treating this fraction at elevated temperature to accomplish cracking, reforming and so forth. Heavier fractions may be cracked catalytically in order to obtain additional yields of motor fuels.

In the catalytic treatments whereby liquid synthesis products are converted to high grade motor fuels, the oxygen-containing organic compounds are decomposed and deoxygenated to produce olefins and lighter hydrocarbons. This results in a liquid product loss, since oxygenated organic compounds in the gasoline boiling range are largely converted to gaseous hydrocarbons. A loss in product quality is also entailed, since certain of these oxygenated compounds have characteristics which make them valuable components of motor fuels. In particular, the lower alcohols and ketones have very high octane numbers and desirable gasoline volatility characteristics. Use has been made of the alcohols, chiefly methyl and ethyl alcohols, for gasoline blending, but such use has not been very satisfactory, chiefly because of the tendency of these alcohols to separate out in the presence of water and because of their poor response to tetraethyl lead.

We have found that a gasoline of improved octane number with satisfactory stability in the presence of water and a good tetraethyl lead susceptibility is obtained by combining with the gasoline produced from synthesis products by ordinary treating methods a mixture comprising alcohols and ketones boiling within the gasoline boiling range, obtained from the oxygenated organic compounds formed in the synthesis process. A particularly good octane improvement is obtained when only the alcohols containing up to five carbon atoms in the molecule and ketones in approximately this same boiling range are combined with the gasoline. A suitable fraction of alcohols and ketones boils within the range of from about 130° F. to about 285° F. An octane improvement in the gasoline of about 4 to 10 points is usually obtained by the addition of this fraction of oxygenates. Increases as high as 12 or more octane numbers may be obtained in some cases, as for example, where the hydrocarbon synthesis is carried out in such a manner as to produce very large amounts of oxygenated compounds. In addition, an increased yield of gasoline is obtained which will amount from about 5 to 15 per cent under the usual operating conditions.

In order to obtain maximum recovery of the lighter oxygenated organic compounds, phase separation of synthesis products before extracting oxygenates from the liquid hydrocarbon phase is preferably carried out so that the latter contains the maximum amount of oxygenated organic compounds. This may be accomplished by the method described in a copending application of Frank H. Bruner, George B. Arnold and Howard V. Hess, Serial No. 694,408, filed August 31, 1946, now U. S. Patent No. 2,605,276. According to the method of said application a liquid mixture, comprising water, hydrocarbons and oxygenated organic compounds, is subjected to a temperature within the range of 200° F. to 400° F. under a pressure of 100 to 500 pounds per square inch. Under these conditions, two immiscible liquid phases are present, a water-rich phase and a hydrocarbon-rich phase. As contrasted with atmospheric temperature conditions, e. g., 50 to 150° F., the higher temperature effects displacement of normally water-soluble oxygenates from the water phase into the hydrocarbon phase. Separation of the hydrocarbon-rich phase from the water-rich phase at 200–300° F. results in a hydrocarbon-rich fraction containing more than the usual quantity of non-acidic oxygenated organic compounds.

Oxygenated organic compounds such as acids, aldehydes and esters which are unsuitable for inclusion in motor fuels may be converted into hydrocarbons and more desirable oxygenated compounds either in the cracking or other catalytic treatments by which the hydrocarbons are converted to motor fuels, or in a separate treating step. Preferably the synthesis product mixture is subjected to a treatment to decompose these oxygenated compounds before the separation of the alcohols and ketones. This may suitably be accomplished by the method described in copending applications of Howard V. Hess, George B. Arnold and Marvin L. Drabkin, Serial No. 68,463, filed December 31, 1948, and Serial No. 127,201, filed November 14, 1949, now U. S. Patent No. 2,591,699. According to this method, the entire liquid hydrocarbon phase or the gasoline fraction thereof, combined with the aqueous phase, is subjected to a high temperature alkali treatment. This is accomplished by passing the gasoline fraction and the water phase obtained from the synthesis reaction product in the vapor state at 500° F. to 1000° F. into contact with a basic compound of an alkali metal or an alkaline earth metal. By this treatment esters are hydrolyzed to alcohols and acids, aldehydes are polymerized to high molecular weight materials which undergo cracking, and acids, both those initially present and those formed by ester hydrolysis, are decarboxylated to form hydrocarbons or ketones.

In the process of our invention a special advantage is obtained when the hydrocarbon synthesis is carried out under a superatmospheric pressure of at least 100 pounds per square inch, so that the subsequent separation and treating steps may be carried out under synthesis pressure or slightly lower. The synthesis is suitably carried out using a synthesis gas comprising hydrogen and carbon monoxide in approximately a 2:1 ratio at temperatures in the range of 500° F. to 750° F. and pressures of about 100 to 500 pounds per square inch, in the presence of a fluidized iron catalyst.

The effluent stream from the reactor is cooled to effect condensation of steam and normally liquid hydrocarbons. Gases, comprising light hydrocarbons, carbon dioxide and unreacted carbon monoxide and hydrogen, are separated from the liquid products and may be recycled in whole or in part to the synthesis reactor or to the synthesis gas generator.

Under the synthesis conditions as described above about 20 per cent by volume of the liquid hydrocarbons produced comprises oxygenated organic compounds. Approximately two thirds by volume of these oxygenates comprise alcohols and ketones and the remainder acids, esters and aldehydes.

According to the preferred embodiment of our invention the hydrocarbon phase is separated from the aqueous phase after condensation of the liquid products and fractionated to obtain a gasoline boiling fraction having an end point of about 400° F., and a heavier hydrocarbon fraction. The gasoline fraction and the combined vapors are phase are vaporized and the aqueous phase passed at a temperature within the range of 500° F. to 1000° F., and preferably at 700° F. to 950° F., over solid sodium carbonate. Preferred conditions include a space velocity of about 1 to 10 volumes of liquid product per volume of solid sodium carbonate per hour.

Effluent gases from the high temperature alkali treatment are cooled to a temperature of about 200° F. to 400° F. at 100 to 500 pounds per square inch pressure to effect condensation of the normally liquid constituents. The small amounts of gases separated from the liquid products comprises chiefly ethane, ethylene and propane formed during the alkali treatment. These gases are advantageously recycled to the synthesis gas generator.

The condensed liquid products separate into a gasoline phase and an aqueous phase. The latter has only a small content of oxygenated organic compounds under the described conditions of condensation, and this may be further reduced by distilling to recover aqueous azeotropes of alcohols, ketones and hydrocarbons. These are suitably added to the charge to the alkali treatment.

The gasoline fraction obtained in the aforedescribed manner has an alcohol content of about 10 to 15 volume per cent, a combined acid and ester content of less than 2 volume per cent and a ketone content of about 2 volume per cent. According to the process of our invention, these oxygenates are removed from the gasoline fraction before the latter is treated catalytically at elevated temperatures to improve octane number and other motor fuel characteristics. This separation is preferably carried by extraction with ethylene glycol, using any suitable procedure such as countercurrent passage of the hydrocarbon fraction in liquid phase with the solvent. The alcohols and ketones thus separated may readily be recovered from the solvent solution by simple distillation.

The raffinate hydrocarbon fraction remaining after the solvent extraction is subjected to a catalytic treatment to improve its suitability as gasoline. Preferably the hydrocarbon fraction is treated under substantially non-cracking conditions by vapor phase contact with a catalyst consisting essentially of alumina to effect isomerization of olefins by shifting of the double bond and conversion of oxygenated compounds to olefins. Pressures ranging from atmospheric to about 25 pounds per square inch, at temperatures within the range of from about 700° F. to about 900° F. and with space velocities between about 1 and about 10 liquid volumes of hydrocarbon per volume of catalyst per hour are preferred conditions. The vaporized hydrocarbon charge is preferably mixed with about 5 to about 50 per cent by weight of water in the form of steam. Suitable catalysts for the treatment comprise bauxite, synthetic alumina, fuller's earth, and other alumina-containing materials which have little activity as cracking catalysts.

Instead of or in addition to the method described above, other treating methods may be employed, so that the invention is not limited to any particular method for carrying out the catalytic finishing process. It may be desirable, for example, to treat the entire liquid hydrocarbon products obtained when the synthesis is carried out to produce predominantly gasoline hydrocarbons, by a process which accomplishes reforming and cracking.

The gasoline obtained by catalytically treating the raw synthesis products is combined with alcohols and ketones separated from the raw gasoline as hereinbefore described to obtain an improved gasoline. Preferably the separated alcohols and ketones are fractionated to separate a fraction boiling in the range of from about 130° F. to about 285° F. and only this fraction combined with the gasoline. The higher boiling fraction of separated alcohols and ketones, e. g., boiling within the range of from about 285° F. to about 400° F. and even as high as 500° F., is advantageously combined with the gasoline fraction before the latter is catalytically treated, so that these are dehydrated and isomerized during the treatment.

However, it is not intended to limit our invention to combining with the gasoline only the fraction of alcohols and ketones boiling within the lower part of the gasoline boiling range as in some cases it will be desirable to include all or a portion of the alcohols and ketones in the upper part of the gasoline boiling range. For example, when the proportion of lower alcohols is relatively large it may be desirable to combine with the gasoline the entire fraction of alcohols and ketones in the gasoline boiling range in order to obtain a blend having the desired degree of stability in the presence of water.

The process of the invention is illustrated in the attached drawing which presents a flow diagram showing how a high quality motor fuel is obtained by the treatment of the synthesis product obtained by the hydrogenation of carbon monoxide.

Hydrogen and carbon monoxide in the approximate ratio of 2 to 1 are introduced through a pipe 1 into a synthesis zone 2 wherein the reactants are converted into a product comprising a gas phase, a water phase, and an oil phase by contact with an iron synthesis catalyst at a temperature in the range of 500 to 750° F. and at a pressure of about 350 lbs. per square inch. Both the oil phase and the water phase contain a substantial quantity of oxygenates in the range of 5 to 20 per cent.

The product from the synthesis zone 2 is passed through a line 3 into a heat exchanger 4 where it is reduced to a temperature of about 300° F. while still being maintained at a pressure of about 350 lbs. per square inch. The partially cooled product is then introduced through a pipe 5 into a separator 6 wherein it is separated at a temperature of about 300° F. and pressure of about 350 lbs. per square inch to a gas phase, an oil phase and a water phase with accompanying displacement of normally water-soluble non-acidic oxygenates into the oil phase. The gas phase is recycled through a pipe 7 to the synthesis zone 2 so as to maintain a recycle ratio of recycle gas to fresh feed of approximately 2.

The entire oil phase in combination with the water phase can be contacted with a basic alkali metal or alkaline earth metal compound in the vapor phase at a temperature between 500 and 1,000° F. to effect hydrolysis of esters to alcohols and acids and decarboxylation of acids to ketones or hydrocarbons. Advantageously, however, the oil phase is fractionated to form a gasoline fraction and a gas oil fraction and the gasoline fraction alone is combined with the water phase for vapor phase caustic treatment. In the event that the entire oil phase plus the water phase is subjected to vapor phase treatment with a solid basic compound, the oil phase removed from the separator 6 through pipe 10 is recombined with the water phase in the pipe 16 through which the water phase is removed from the separator 6. The bypass pipe 9 connects pipe 10 with pipe 16. The preferred modification involving vapor phase caustic treatment of the gasoline fraction plus the water phase is described hereafter.

The oil phase is introduced through a pipe 10 into a fractionator 11 wherein it is separated into a naphtha fraction and a gas oil fraction. The gas oil fraction is withdrawn from the fractionator 11 through a pipe 12. Further treatment of gas oil phase will not be described since the invention is concerned with the production of a high octane motor fuel from the naphtha fraction.

The naphtha fraction is taken off from the fractionator 11 through a pipe 15 and is recombined with the water phase which is removed from the high temperature-pressure separator 6 through a pipe 16. The combined naphtha fraction and water phase are heated to a temperature of about 800° F. in a heat exchanger 17 and are then introduced in the vapor state through a pipe 18 into a treater 19 wherein the naphtha fraction and the water phase are contacted in the vapor phase with a basic compound of an alkali metal or an alkaline earth metal with the resulting hydrolysis of esters to alcohols and acids, decarboxylation of acids to ketones or hydrocarbons and polymerization plus cracking of aldehydes. The vapor phase treatment of the combined naphtha and water phases effects conversion of the oxygenates mainly to alcohols and ketones.

There is removed from the treating zone 19 an effluent product which is introduced through a pipe 21 into a heat exchanger 22 wherein it is cooled to a temperature of about 350° F. The partially cooled product is then introduced through a pipe 23 into a high temperature-pressure separator 24 wherein the caustic-treated naphtha and water fractions are separated into a gas phase, hydrocarbon phase and water phase at an elevated temperature of about 300° F. and at an elevated pressure of about 350 square lbs. per inch. The gas phase, which is a relatively minor portion comprising light hydrocarbons produced by cracking in the vapor phase caustic treatment, is recycled to the synthesis zone 2 through a pipe 25.

The water phase is withdrawn from the separator 24 through a pipe 25 and may be flashed in a tower 26 to produce an oxygenate azeotrope fraction which is removed from the tower 26 through a pipe 27. Reject water is withdrawn from the tower 26 through a pipe 28.

The hydrocarbon phase is withdrawn from the separator 24 through a pipe 30 and is introduced into a tower 31 wherein it is subjected to countercurrent extraction with diethylene glycol. As a result of glycol extraction there is formed an extract phase containing oxygenates, which are mainly alcohols and ketones, and a raffinate phase comprising mainly naphtha hydrocarbons. The extract phase is withdrawn from the bottom of the tower 31 through a pipe 32, and is introduced into a fractionating column 35.

In the fractionating column 35 the extract phase is distilled to yield an alcohol-ketone fraction boiling in the range of 130 to 285° F., and a second alcohol-ketone fraction distilling in the range of 285 to about 400° F. The low boiling fraction is taken off overhead from the column 35 through a pipe 36 and is combined with the naphtha fraction which has been treated in a manner which will be described hereafter. The distillation residue comprising mainly diethylene glycol solvent is withdrawn from the column 35 through a pipe 38 and is recycled to the extraction tower 31 for reuse in the extraction of oxygenates from the naphtha fraction.

The alcohol-ketone fraction distilling between 285 and 400° F. is withdrawn from the column 35 through a pipe 40 and is combined with the naphtha fraction which is substantially oxygenate-free and which is withdrawn from the tower 31 through a pipe 42. The combined naphtha and high boiling alcohol-ketone fraction are heated to a temperature of about 800° F. in a heat exchanger 43, and introduced through a pipe 44 into a treater 45 wherein the combined fractions are contacted with alumina. Contact of the combined fractions with alumina causes isomerization of olefins in the naphtha fraction and dehydrogenation of the high boiling alcohols and ketones to yield olefinic hydrocarbons boiling in the naphtha range. The catalytic treatment in this manner substantially improves the quality of the naphtha fraction for use in motor fuel.

There is withdrawn from the treater 45 through a pipe 46 a naphtha fraction of high octane rating which is cooled in the exchanger 47 and then combined with the 130 to 285° F. alcohol-ketone fraction obtained on distillation of the oxygenate extract phase. The blending of the low boiling alcohol-ketone fraction with the treated naphtha fraction effects approximately a six-unit octane improvement therein. As a consequence there is produced a high quality fuel which utilizes a substantial quantity of oxygenates produced in the synthesis conversion. The motor fuel which is passed to storage through the pipe 50 is characterized by exceptionally high octane rating and possesses high stability. In addition, the process of the invention effects a maximum yield of motor fuel of high octane rating from the synthesis product.

While the method of our invention has been described with reference to the hydrocarbon synthesis carried out so as to produce predominantly hydrocarbons of the gasoline boiling range, the invention is not to be construed as limited to this method of conducting the hydrocarbon synthesis, as other methods may be employed also. For example, the process of this invention may be very advantageously applied in working up the gasoline boiling fraction obtained by a process, whereby relatively large amounts of oxygenates are obtained by conducting the synthesis at pressures within the range of 270 to 450 pounds per square inch and temperatures within the range of about 350° F. to 395° F., employing an unsupported fused iron catalyst. It is understood also that the usual refining processes such as cracking of heavy oils, polymerization of light olefins, alkylation, and so forth, may be used in conjunction with our process.

Obviously, many modifications and variations of the invention, as hereinbefore set forth, may be made without departing from the spirit and scope thereof and, therefore, only such limitations should be imposed as are indicated in the appended claims.

We claim:
1. A process for producing a motor fuel from a liquid synthesis product comprising water, hydrocarbons and oxygenated hydrocarbons obtained by the hydrogenation of carbon monoxide which comprises separating said liquid synthesis product into an aqueous phase and an oil phase, fractionating said oil phase to obtain a gasoline fraction boiling in the range of about 100 to 400° F. and a gas oil fraction boiling above 400° F., combining said gasoline fraction with the aqueous phase, subjecting the combined aqueous phase and gasoline fraction to vapor phase treatment at a temperature in the range of 500 to 1,000° F. with a basic catalyst selected from the group consisting of alkali metal compounds, alkaline earth metal compounds and mixtures thereof whereby oxygenated hydrocarbons are converted chiefly to hydrocarbons, aldehydes and ketones, condensing and separating the resulting product to form a gas phase, a gasoline fraction and an aqueous phase, extracting said gasoline fraction with a hydrocarbon immiscible alcohol solvent to form a raffinate gasoline fraction and an extract phase containing dissolved alcohols and ketones, subjecting said extract phase to distillation to yield a low boiling oxygenate fraction comprising mainly alcohols and ketones and a high boiling oxygenate fraction comprising mainly alcohols and ketones, combining said high boiling oxygenate fraction with said raffinate gasoline fraction to form a composite phase, subjecting said composite phase to thermal catalytic treatment to improve its motor fuel characteristics and adding said low boiling oxygenate fraction to said composite phase after its thermal catalytic treatment with the resulting production of a high yield of high octane motor fuel.

2. A process according to claim 1 in which the high boiling oxygenate fraction combined with the gasoline raffinate phase prior to thermal catalytic treatment boils above 285° F.

3. A process according to claim 1 in which the low boiling oxygenate fraction combined with the composite phase after thermal catalytic treatment boils in the range of 130 to 285° F.

JAMES H. GRAHAME.
KEVIN E. KAVANAGH.
THOMAS H. WHALEY, Jr.

References Cited in the file of this patent

UNITED STATES PATENTS

| Number | Name | Date |
|---|---|---|
| 1,713,530 | Hammond | May 21, 1929 |
| 2,010,005 | Berliner | Aug. 6, 1935 |
| 2,176,747 | Schneider | Oct. 17, 1939 |
| 2,178,403 | Muskat | Oct. 31, 1939 |
| 2,470,216 | Keith | May 17, 1949 |
| 2,470,782 | McGrath et al. | May 24, 1949 |
| 2,501,115 | White | Mar. 21, 1950 |
| 2,558,556 | Hess et al. | June 26, 1951 |